(12) United States Patent
Blumberg et al.

(10) Patent No.: US 7,111,504 B2
(45) Date of Patent: Sep. 26, 2006

(54) ATOMIC FORCE MICROSCOPE

(75) Inventors: Girsh Blumberg, New Providence, NJ (US); Carl Johannes Schlockermann, Puchheim (DE)

(73) Assignee: Lucent Technologies Inc., Murray Hill, NJ (US)

( * ) Notice: Subject to any disclaimer, the term of this patent is extended or adjusted under 35 U.S.C. 154(b) by 12 days.

(21) Appl. No.: 10/954,739

(22) Filed: Sep. 30, 2004

(65) Prior Publication Data

US 2006/0065047 A1    Mar. 30, 2006

(51) Int. Cl.
*G01B 5/28* (2006.01)
*G01N 13/16* (2006.01)

(52) U.S. Cl. ...................................... 73/105
(58) Field of Classification Search ................. 73/105; 250/306, 307
See application file for complete search history.

(56) References Cited

U.S. PATENT DOCUMENTS

| | | | | |
|---|---|---|---|---|
| 4,987,303 | A | 1/1991 | Takase et al. | 250/306 |
| 5,440,121 | A | 8/1995 | Yasutake et al. | 250/306 |
| 5,631,410 | A | 5/1997 | Kitamura | 73/105 |
| 5,939,715 | A * | 8/1999 | Kitamura et al. | 250/234 |
| 6,189,374 | B1 | 2/2001 | Adderton et al. | 73/105 |
| 6,530,266 | B1 | 3/2003 | Adderton et al. | 73/105 |
| 6,590,208 | B1 | 7/2003 | Massie | 250/306 |
| 6,672,144 | B1 | 1/2004 | Adderton et al. | 73/105 |
| 2002/0062684 | A1 | 5/2002 | Adderton et al. | 73/105 |
| 2002/0096642 | A1 | 7/2002 | Massie | 250/453.11 |
| 2003/0094036 | A1 | 5/2003 | Adderton et al. | 73/105 |
| 2004/0069944 | A1 | 4/2004 | Massie | 250/306 |

FOREIGN PATENT DOCUMENTS

DE    102 08 800 A1    9/2003

OTHER PUBLICATIONS

"Atomic force microscope," published online by or before Sep. 19, 2004 at: http://en.wikipedia.org/wiki/Atomic_force_microscope, 2 pages.
Baselt, D., "Atomic force microscopy—Measuring intermolecular interaction forces," published online by or before Sep. 19, 2004 at: http://stm2.nrl.navy.mil/how-afm/how-afm.html, 12 pages.
Putman, C.A. et al., "A New Imaging Mode in Atomic-Force Microscopy Based on the Error Signal," SPIE vol. 1639, Scanning Probe Microscopies (1992), pp. 198-204.
Akiyama, T. et al., "Fast driving Technique for Integrated Thermal Bimorph Actuator Toward High-Throughput Atomic-Force Microscopy," Review of Scientific Instruments, vol. 71, No. 7, pp. 2643-2646, Jul. 2002.

* cited by examiner

*Primary Examiner*—Daniel S. Larkin
(74) *Attorney, Agent, or Firm*—John F. McCabe (57) ABSTRACT

An apparatus includes a sample stage, a cantilever mount, a cantilever-force detector, a cantilever feedback system, and a sample stage feedback system. The sample stage is configured for holding a sample. The cantilever mount is configured for mechanically fixing a mechanical cantilever having a scanning tip. The cantilever-force detector is configured to produce an electrical cantilever-force error signal. The cantilever feedback system is configured to electromechanically drive the mechanical cantilever in a manner responsive to the cantilever-force error signal. The sample stage feedback system is configured to electromechanically displace the sample stage in a manner responsive to the cantilever-force error signal. The cantilever feedback system and the sample stage feedback system are connected to receive the cantilever-force error signal in parallel.

19 Claims, 9 Drawing Sheets

ATOMIC FORCE MICROSCOPE

BACKGROUND

1. Field of the Invention

The invention relates to atomic force microscopes and methods of operating atomic force microscopes.

2. Discussion of the Related Art

An atomic force microscope (AFM) is a high-resolution device for producing scanned images of the surfaces of samples. One type of AFM has a flexible cantilever with a narrow tip, a deflection detector, a sample stage, and cantilever and sample stage feedback/drive systems. The AFM produces an image by mechanically scanning the cantilever's tip over a surface of a sample. During scanning, the deflection detector measures the amount of cantilever bending. The amount of bending is related to the vertical force that the sample exerts on the cantilever's tip, i.e., the sample-cantilever force. During the scanning, the feedback/drive systems produce movements for restoring this sample-cantilever force to an initial state. The AFM produces a topographical image of the sample's surface by recording the tip displacement needed to keep the sample-cantilever force at a preselected setpoint value during scanning.

In some AFMs, the feedback system has an active electronic cantilever controller and a active electronic sample stage controller in a nested configuration. In the nested configuration, the cantilever controller responds to an error signal from the deflection detector. The error signal is substantially proportional to the difference between the force exerted by the sample on the tip and a preselected setpoint value. Thus, the error signal is roughly proportional to the amount of bending of the cantilever. In response to the error voltage, the cantilever controller generates an about proportional voltage to drive a piezoelectric device to produce a restoring displacement of the cantilever. In the nested feedback system, the sample stage controller receives the drive voltage produced by the cantilever controller. In response to the drive voltage, the sample stage controller generates a voltage to drive another piezoelectric device to produce a restoring displacement of the sample stage. Together, the restoring displacements of the cantilever and sample stage restore the force exerted by the sample's surface on the tip to the preselected setpoint value.

Many AFMs produce an image of a sample surface in which the resolution vertical to the sample's surface is very high, e.g., better than 1 nanometer (nm) or even better than 0.1 nm. To obtain such high resolutions, setups for AFMs typically have to limit environmental vibratory noise. One source of such noise is low-frequency oscillations of the floor in the room where the AFM is set up, i.e., building noise. Usually, a setup for an AFM includes mechanical isolation to damp building noise and an acoustic box to eliminate acoustical noise. In many cases, environmental noise limits the upper scanning speed and/or the depth resolution obtainable with an AFM.

BRIEF SUMMARY

Various embodiments provide atomic force microscopes (AFMs) that are less sensitivity to the low-frequency environmental noise. The AFMs have both cantilever and sample stage feedback controllers. The feedback controllers are connected in a parallel configuration so that both controllers receive a voltage signal indicative of the error in the force that the sample exerts on the cantilever. The parallel configuration suppresses the impact of low-frequency electrical and mechanical noise on the sample stage more effectively than typical nested feedback configurations. In particular, the parallel configuration reduces the excitation of resonant mechanical vibration modes in the sample stage at low frequencies associated with building and acoustic noise. Thus, it may be possible to use less shielding for low-frequency environmental noise and thus, provide more accessible AFM setups.

One embodiment features an apparatus that includes a sample stage, a cantilever mount, a cantilever-force detector, a cantilever feedback system, and a sample stage feedback system. The sample stage is configured for holding a sample. The cantilever mount is configured for mechanically fixing a mechanical cantilever having a scanning tip. The cantilever-force detector is configured to produce an electrical cantilever-force error signal. The cantilever feedback system is configured to electromechanically drive the mechanical cantilever in a manner responsive to the cantilever-force error signal. The sample stage feedback system is configured to electromechanically displace the sample stage in a manner responsive to the cantilever-force error signal. The cantilever feedback system and the sample stage feedback system are connected to receive the cantilever-force error signal in parallel.

Another embodiment features an apparatus for an atomic force microscope. The apparatus includes a sample stage, a cantilever mount, a cantilever-force detector, a cantilever feedback system, a high-pass filter, and an electromechanical driver. The sample stage is configured to support a sample. The cantilever mount is configured to mechanically fix a cantilever having a scanning tip. The cantilever-force detector is configured to produce an electronic error signal substantially representative of a force exerted by the sample on the tip. The cantilever feedback system is configured to receive the error signal and to electromechanically drive the tip responsive to the received error signal. The high-pass filter is configured to produce a filtered driving signal responsive to the error signal. The electromechanical driver is configured to receive the filtered driving signal and to displace a portion of the cantilever responsive to said filtered driving signal.

One embodiment features a method of operating an atomic force microscope. The method includes laterally scanning a tip of a flexible mechanical cantilever over a surface of a sample. While performing the scanning, the method includes producing an error signal substantially representative of a force exerted by the sample on the cantilever. While performing the scanning, the method includes driving the mechanical cantilever with an electromechanical driver in a manner responsive to the error signal. The step of driving by the electromechanical driver produces a displacement of the cantilever without a substantial zero-frequency component.

BRIEF DESCRIPTION OF THE DRAWINGS

In the Figures and text, like reference numerals indicate elements with similar functions.

In the Figures, relative sizes of various features may be magnified or reduced in size to better illustrate the embodiments.

Various embodiments are described by the detailed description and Figures. The inventions may, however, be embodied in various forms and are not limited to embodiments described in the Figures and detailed description.

DETAILED DESCRIPTION OF ILLUSTRATIVE EMBODIMENTS

Figure 1:
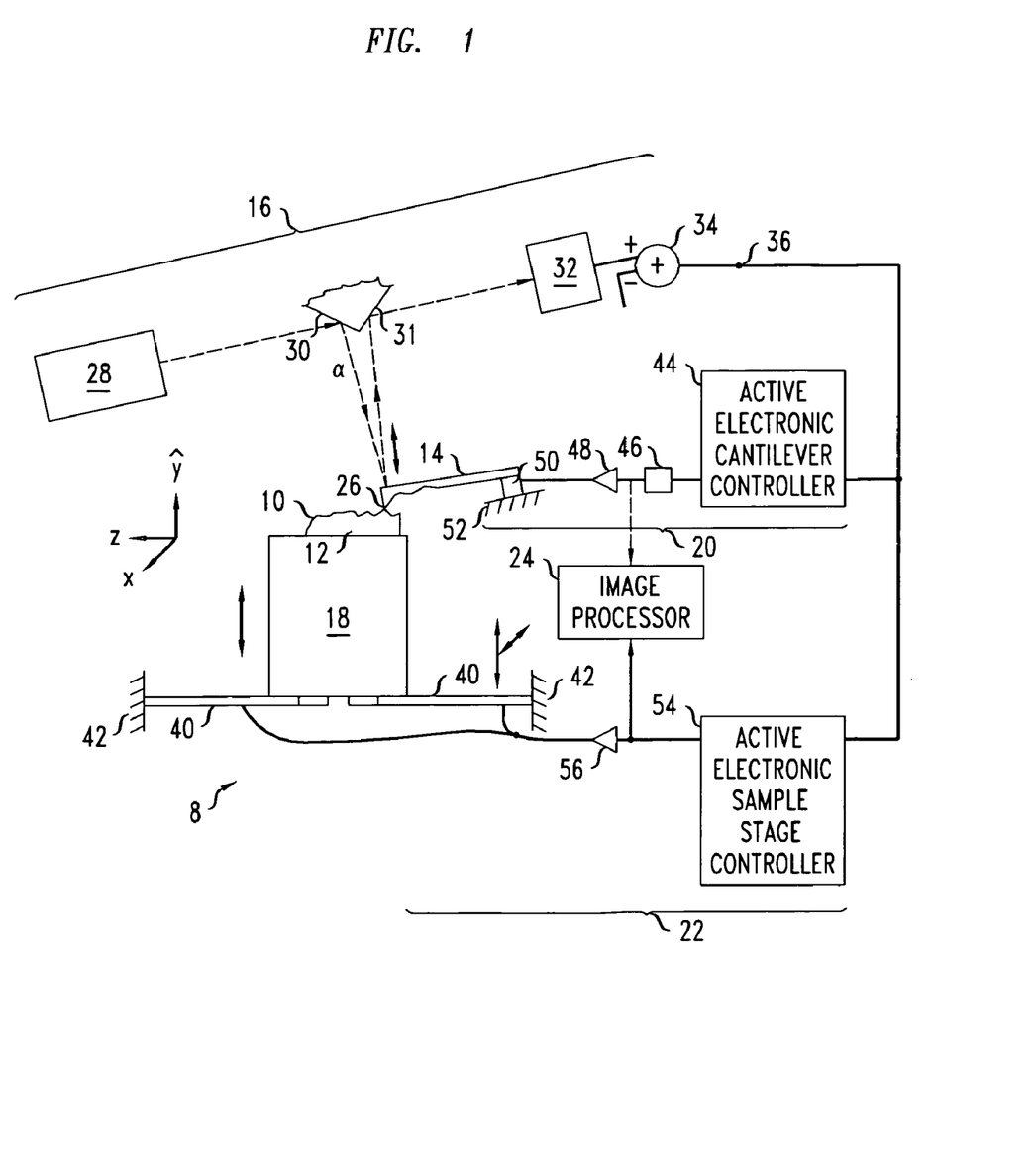
FIG. 1 provides a schematic view of an AFM.

FIG. 1 illustrates an AFM 8 that is configured to image surface 10 of sample 12. The AFM 8 includes a flexible mechanical cantilever 14, a cantilever-force detection system 16, a sample stage 18, an active cantilever feedback system 20, an active sample stage feedback system 22, and an image processor 24.

The mechanical cantilever 14 includes a fine tip 26. During a scan, the fine tip 26 either is in contact with the sample surface 10 or oscillates over the surface 10, e.g., to regularly tap the surface 10. During both the contact and oscillatory modes of scanning, the surface 10 of the sample 12 exerts a vertical force on the tip 26, i.e., along the ŷ-direction, and thus, exerts a vertical force on the free end of the mechanical cantilever 14. In the contact mode of scanning, the vertical force affects the amount of bending of the mechanical cantilever 14. In the oscillatory mode of scanning, the vertical force exerted by the surface 10 on the tip 26 affects the oscillation amplitude of the tip 26. Scanning the tip 26 over a step, bump, or valley on the surface 10 changes the amount of cantilever bending in the contact mode of scanning and changes the oscillation amplitude for the tip 26.

In oscillation mode, an adder is located between high-pass filter 46 and amplifier 48. The adder sums an AC driving signal and a signal used to control the piezoelectric driver 50. Also, in oscillation mode, the diode detector includes either a rectifier, e.g., a voltage squarer, followed by a low pass filter that removes the AC driving signal to produce a cantilever-force error voltage signals output port 36.

The cantilever-force detection system 16 measures the vertical force exerted on the tip 26 by the surface 10 of the sample 12. Since the exerted force determines the amount of cantilever bending, the cantilever-force detection system 16 also measures the amount of bending of the cantilever 14. The cantilever-force detection system 16 is configured to generate a cantilever-force error voltage at output port 36. Herein, an output voltage is referred to as a cantilever-force error voltage if the output voltage substantially represents the difference between the actual vertical force exerted on the cantilever's tip 26 and a preselected vertical force value. In particular, a cantilever-force error voltage is a monotonic function of this difference in the useable range of forces. Also, up to a constant setpoint voltage, a cantilever-force error voltage is small when the vertical sample force exerted on the tip 26 is small and large when the vertical sample force exerted on the tip 26 is large. For example, up to a setpoint voltage subtraction, the cantilever-force error voltage may be about proportional to the force exerted by the sample surface 10 on the tip 26.

Similarly, the cantilever-force error voltage is monotonic in the amount of cantilever bending for the usable range of cantilever bending, i.e., up to the setpoint value. The cantilever-force error voltage is also small when the amount of cantilever bending is small and is large when the amount of cantilever bending is large. Thus, the cantilever-force error voltage can also be referred to as a cantilever-deflection error voltage.

The cantilever-force detection system 16 includes a laser 28, a pair of mirrors 30, 31, an array-type photo-diode detector 32, and a voltage subtractor 34. The laser 28 produces a light beam, which reflects off mirror 30 to focus onto on a reflective backside of the cantilever 14. The light beam reflects off the reflective backside of the cantilever 14 and is redirected by the mirror 31 onto the photo-diode detector 32. The photo-diode detected 32 is spatially segmented to detect the position of the received light beam. From the beam's position, the photo-diode detector 32 is configured to produce at output voltage representative of the angular deviation of the received light beam. Thus, the photo-diode detector 32 produces an output voltage that measures the amount of bending of the cantilever 14, i.e., a cantilever-deflection error voltage or a force-error voltage. The electronic subtractor 34 subtracts a set point voltage, Vs, from the output voltage of the photo-diode detector 32 to produce an error voltage at output port 36 that is suitably zeroed. Then, at output port 36, the voltage signal substantially represents the difference between the actual force exerted on the tip 26 by the surface 10 and the force that would be exerted by the surface 10 on the tip 26 if the cantilever 14 was in a preselected bending state.

Alternate embodiments may have a cantilever-force detection system that is based on other technologies known to those of skill in the art.

Figure 2:
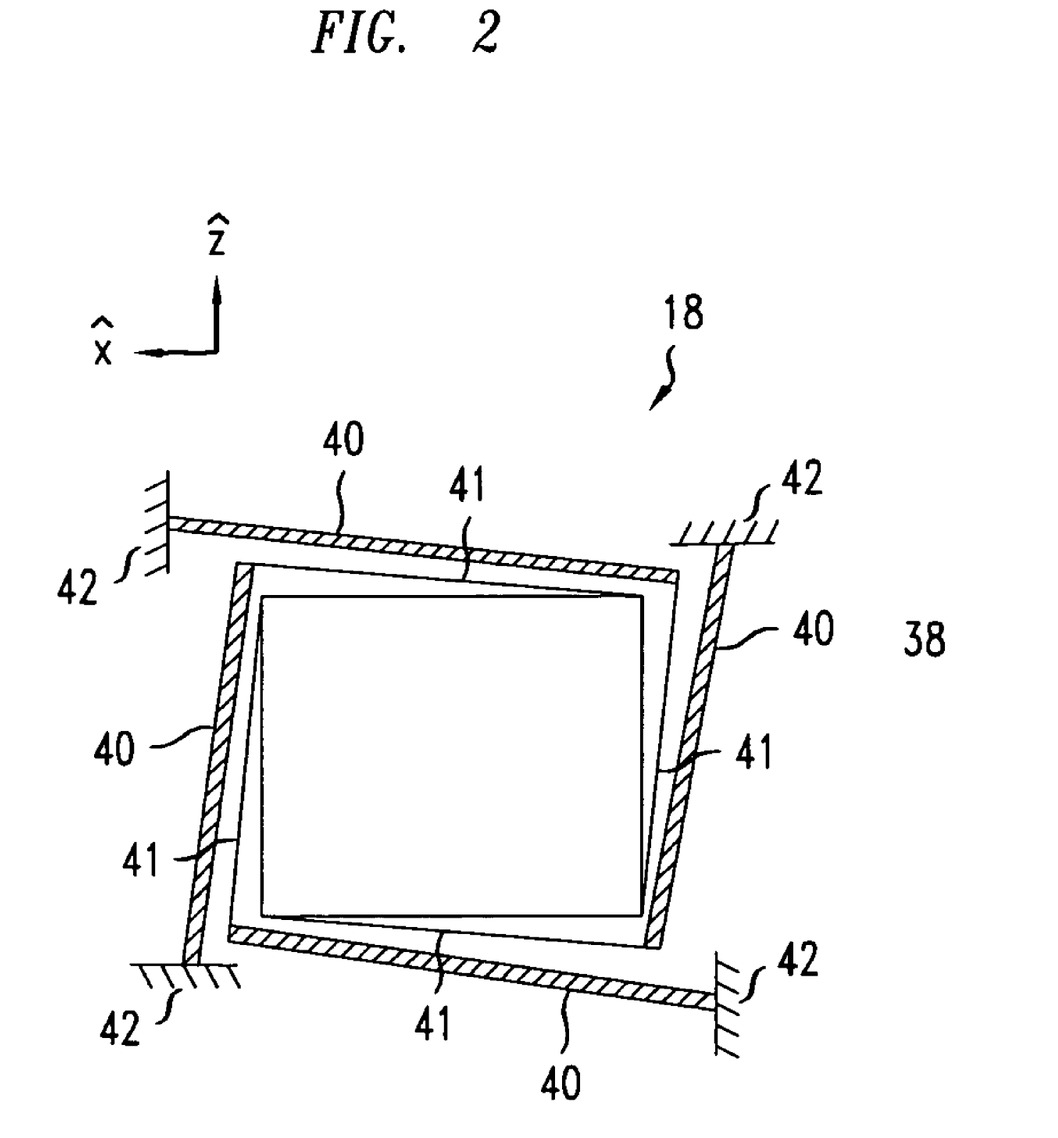
FIG. 2 is a top view of the sample stage of the AFM shown in FIG. 1.

Referring to FIGS. 1–2, the sample stage 18 includes a sample platform 38, piezoelectric drivers 40, and metal connectors 41. The sample platform 38 provides a rigid support for both holding and displacing the sample 10 in three dimensions. The piezoelectric drivers 40 mechanically connect to the flexible metal connector 41 and to fixed supports 42. Together, the piezoelectric drivers 40 and the metal connectors mechanically connect the sample platform 38 to the fixed supports 42. In response to appropriate driving voltages, the piezoelectric drivers 40 produce lateral scanning movements along the x-axis and z-axis, e.g., to produce raster scans of the surface 10 of the sample 12. In response to other appropriate driving voltages, the piezoelectric drivers 40 also produce vertical restoring displacements of the sample platform 38 and sample stage 18 along the y-axis.

Figure 3:
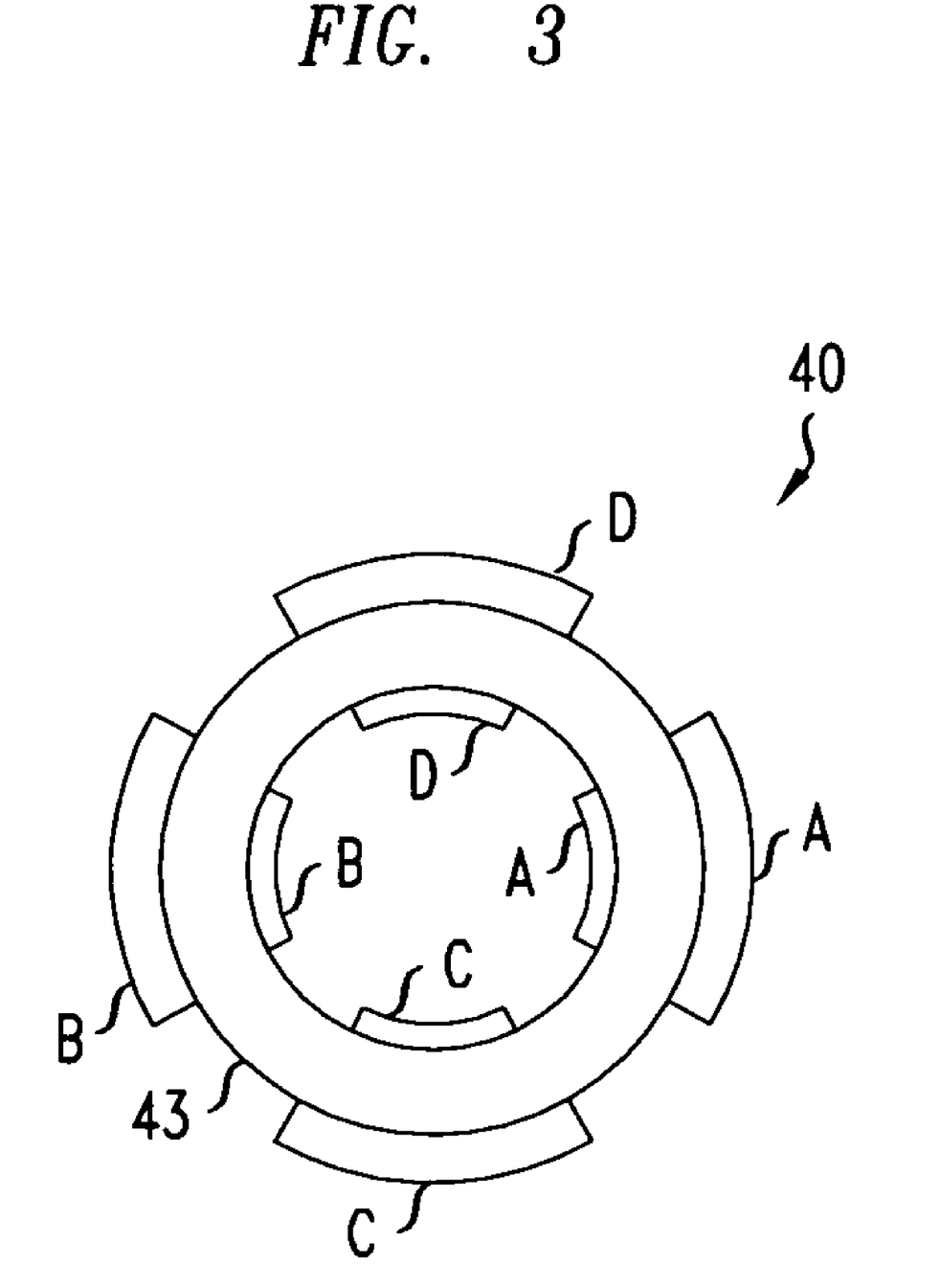
FIG. 3 is a cross-sectional view of one of the piezoelectric drivers of the sample stage shown in FIG. 2.

Referring to FIG. 3, each piezoelectric driver 40 includes a piezoelectric cylinder 43 and four pairs of control electrodes A, B, C, D. The pairs of control electrodes A–D are located around the circumference of the piezoelectric cylinder 43. In response to applying appropriate voltages across pairs of electrodes located at opposite sides of the cylinder 43, i.e., pairs (A, B) or pairs (C, D), the piezoelectric cylinder 43 bends along the direction connecting the pairs. By coordinated bending motions, facing pairs of piezoelectric drivers 40 in FIG. 2 produce lateral scanning and vertical restoring displacements of the sample platform 38 and the sample 12.

Referring again to FIG. 1, the active cantilever feedback system 20 includes an active electronic cantilever controller 44, a high-pass filter 46, an amplifier 48, and a piezoelectric driver 50. The active electronic cantilever controller 44 is a proportional type or a proportional plus differential type voltage amplifier with a tunable amplification. The active electronic cantilever controller 44 produces an output voltage substantially proportional to the deflection error voltage received from output port 36 of the cantilever-force detection system 16. The high-pass filter 46 removes the low and zero frequency portions of the voltage generated by the active electronic cantilever controller 44. The high-pass filter 46 is tuned to have its lower frequency cutoff below the mechanical resonance frequencies of the sample stage 18. Exemplary high-pass filters 46 may, e.g., have lower frequency cutoffs of 30–500 Hertz or lower. The amplifier 48 is a high voltage proportional amplifier that amplifies the output voltages from the high-pass filter 46 to be in a range suitable for driving the piezoelectric driver 50, e.g., 100–300 volts. The piezoelectric driver 50 is, e.g., a slab or stacked piezoelectric structure whose vertical or y-direction height expands and contracts in a manner responsive to the driving voltage received from the amplifier 48. Due the relatively rigid form of slab and stack devices, the piezoelectric driver 50 does not have mechanical resonances, at least, for the low frequencies of the voltage signals typically generated by the active electronic cantilever controller 44. Thus, the piezoelectric driver 50 has a substantially linear and instantaneous response to the driving voltage. The piezoelectric driver 50 forms a mechanical support between one end of the mechanical cantilever 14 and a cantilever mount 52, which fixes the piezoelectric driver/mechanical cantilever assembly to a fixed support. For that reason, the height variations of the piezoelectric driver 50 adjust the vertical position of the attached end of the mechanical cantilever 14 thereby adjusting the force exerted on the tip 26 by the surface 10 of the sample 12.

The active sample stage feedback system 22 includes an active electronic sample stage controller 54, an amplifier 56, and the piezoelectric drivers 40. The active electronic sample stage controller 54 produces output voltage signals configured to cause restoring displacements of the sample stage 18 along the y-axis and to produce scanning motions of the sample stage along the x-axis and z-axis. With respect to the restoring displacements, the active electronic sample stage controller 54 includes an integrating amplifier or an integrating plus proportional amplifier. The amplifier is connected to receive the force error voltage from output port 36 of the cantilever-force detection system 16. In response to the error voltage, the active electronic sample stage controller 54 produces an output voltage that is substantially a temporal integral of the error voltage. This output voltage drives y-axis vertical displacements by the sample platform 38 and thus, by the sample stage 18. These y-axis displacements are designed to restore the time-averaged force exerted on the cantilever 14 to zero, i.e., so that the time-averaged force error voltage approaches zero. With respect to the scanning motions, the active electronic sample stage controller 54 produces output voltages that cause the piezoelectric drivers to generate lateral x-axis and z-axis scanning motions by of the sample stage 18, e.g., raster scanning motions. The amplifier 56 is a high voltage amplifier that proportionally amplifies output voltages from the active electronic sample stage controller 54 to be in a range suitable for driving the piezoelectric drivers 40.

The image processor 24 produces a topographical image of the surface 10 of the sample 12 from measured values of the driving voltages of the active electronic sample stage controller 54 during scanning. The image processor 24 uses the x-direction and z-direction driving voltages to determine lateral positions of the top surface of the sample stage 18 or sample platform 38 during scanning. In some embodiments, the image processor 24 uses y-direction driving voltage to determine vertical heights of features on the surface 10 of the sample 12, i.e., from vertical positions of the top surface of the sample stage 18. Alternatively, the image processor 24 determines vertical heights of features on the surface 10 from the drive voltages of both the cantilever 14 and the sample stage 18. In this embodiment, the image processor 24 would subtract the vertical height of the tip 26 from the vertical height of the top surface of the sample stage 18, wherein the heights are determined from the driving voltages generated by the active electronic sample stage controller 54 and the active electronic cantilever controller 44, respectively. By using driving voltages of the two electronic controllers 54, 44, it may be possible to determine heights of sample features more rapidly. Such a method may enable scanning times to be faster than the time needed to completely restore the cantilever's piezoelectric driver 50 to its initial height D as shown-below in FIGS. 7–8.

Exemplary structures for the mechanical cantilever mount 52, cantilever-force detection system 16, piezoelectric drivers 40, 50, and sample stage 18 may be obtained commercially. For example, Nanonics Imaging Limited of Manhat Technology Park, Malcha, Jerusalem 91487 Israel (www.nanonics.co.il) sells a unit incorporating these devices under product name "NSOM 100". The Nanonics device includes a piezoelectric driver for producing oscillation mode scanning of the cantilever tip. This piezoelectric driver can function as the piezoelectric driver 50 in the AFM 8 of FIG. 1.

Figure 4:
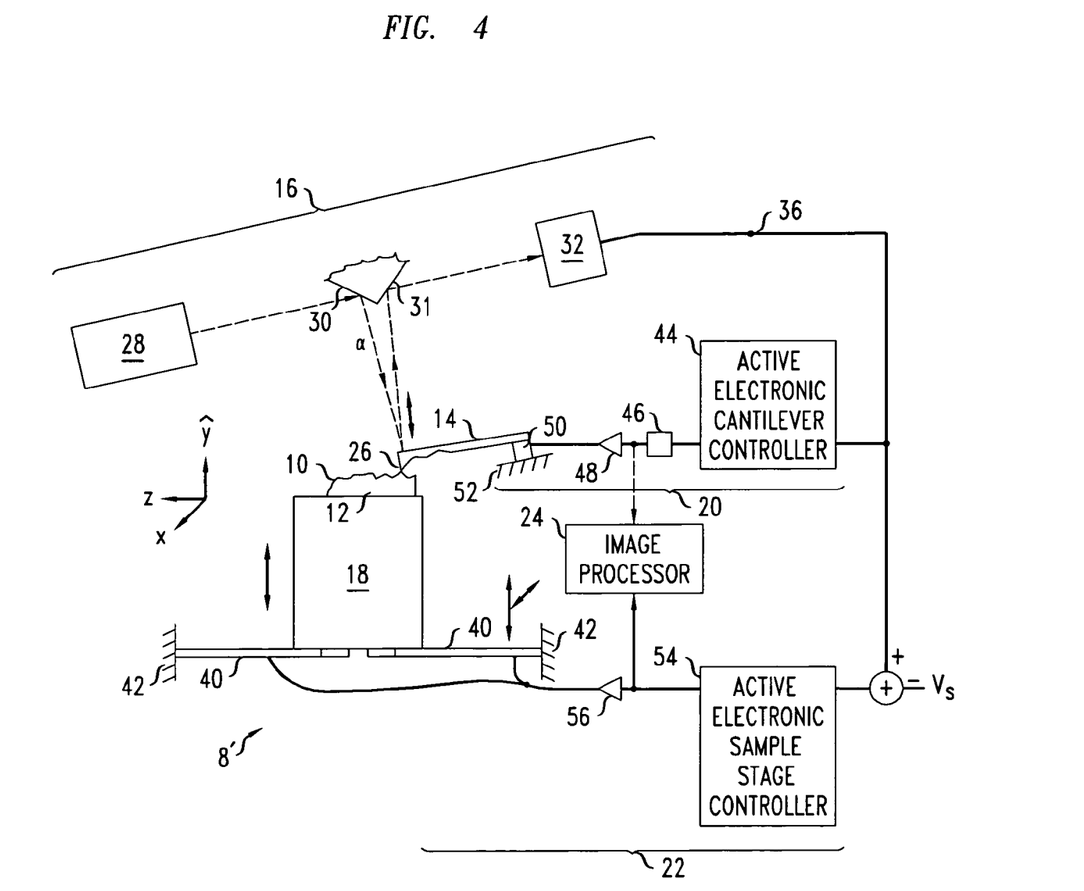
FIG. 4 provides a schematic view of another embodiment of an AFM.

FIG. 4 shows an alternate embodiment of an AFM 8', which is substantially similar to the AFM 8 of FIG. 1 except for the placement of the subtraction of an setpoint voltage. In the AFM 8', the voltage subtractor 34 only subtracts the constant setpoint voltage, Vs, from the voltage signal applied to the active electronic sample stage controller 54. Such a placement of the voltage subtraction does not affect operation of the cantilever feedback circuit 20 due to the high-pass filter 46. Also, both active cantilever feedback system 20 and active sample stage feedback system 22, which includes subtractor 34, still receive the force error voltage from the cantilever-force detection system 16 in parallel.

Figure 5A:
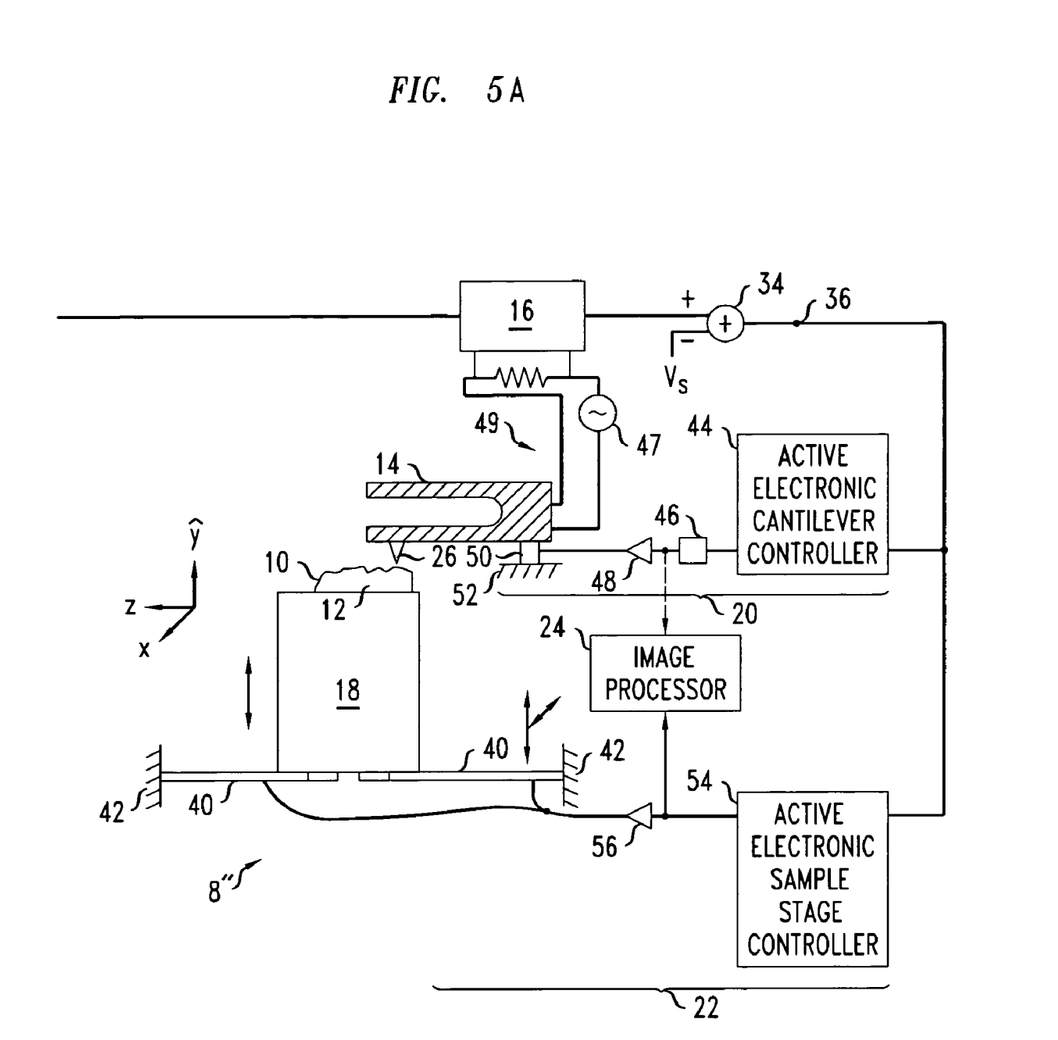
FIGS. 5A and 5B show schematic views of other embodiments of AFM that are based on vibrating tuning forks.
Figure 5B:
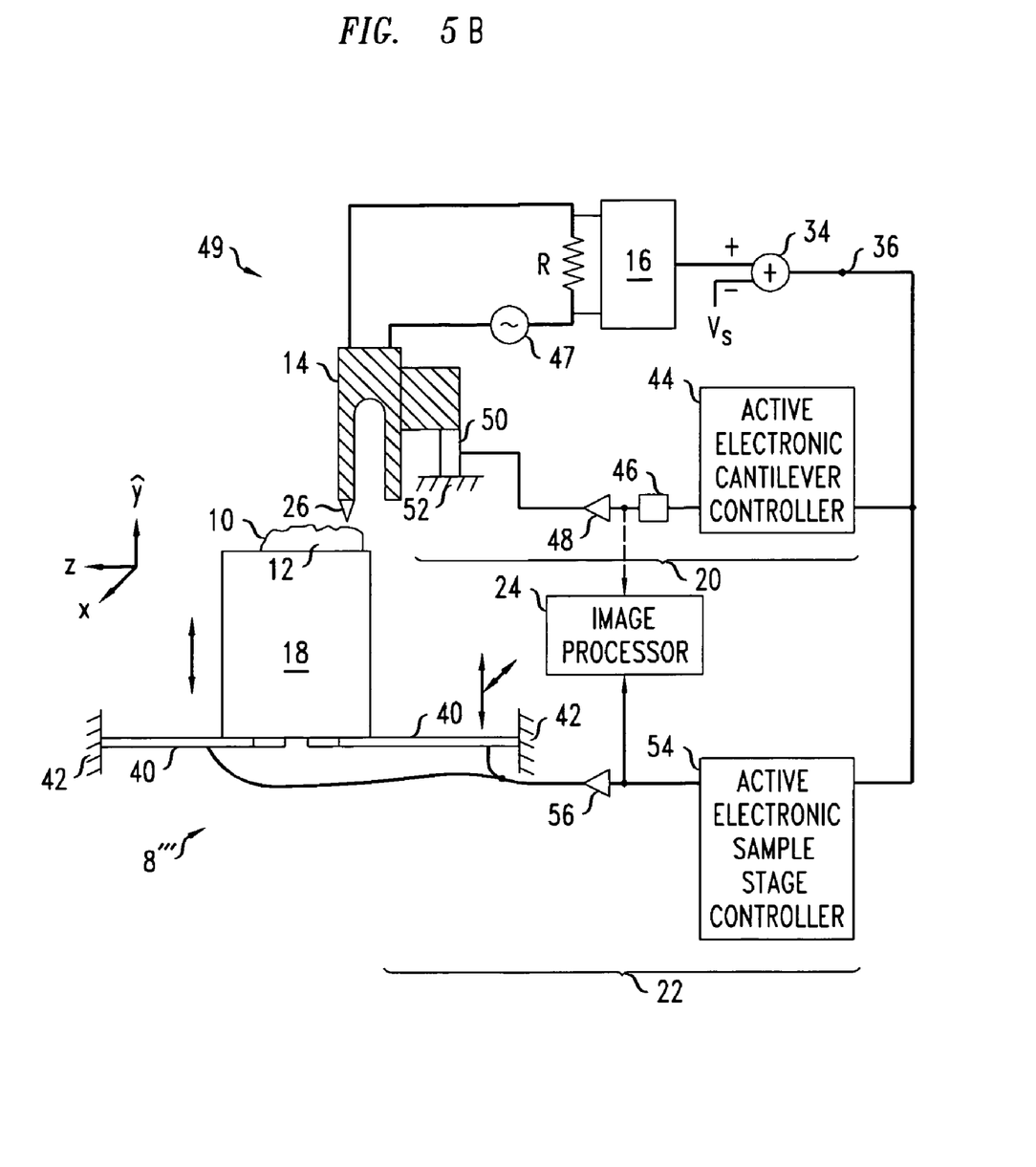

FIGS. 5A–5B show alternate AFMs 8", 8''' that are similar to the AFM 8 of FIG. 1, but are based on tuning forks. In the AFMs 8", 8''', the mechanical cantilever 14 is a piezoelectric tuning fork that is fixed to piezoelectric driver 14 and thus, is also fixed to the cantilever mount 52. The piezoelectric driver 50 is, in turn, fixed to the cantilever mount 52. The piezoelectric driver 50 produces vertical displacements that drive the tuning fork 14 toward a preselected stable condition.

A drive circuit 49 and voltage oscillator 47 drive the piezoelectric tuning fork 14 to be in a near resonant condition. Then, the interaction between the tip 26 and the surface 10 of the sample 12 will affect the amplitude and phase of the tuning fork's oscillation via altering the impedance of the tuning fork 14. By measuring the tuning fork's impedance, the force detection system 16 electrically measures the force exerted by the sample 10 on the oscillating tuning fork 14 during scanning. The impedance may, e.g., be obtained by measuring the current in resistor R of driving circuit 49. Other embodiments of cantilever-force detection system 16 may use the ratio of the tuning fork's driving voltage to the phase of the current to measure the force exerted by the sample 10 on the tuning fork 14.

The force detection system 16 also includes a rectifier and a low pass filter adjacent the input to subtractor 34. The combination of a rectifier and a low-pass filter change the measured AC current or voltage into cantilever-force error voltages. After setpoint subtraction, the cantilever-force error voltage is transmitted in parallel to the cantilever control system 20 and the sample stage control system 22.

Figure 6:
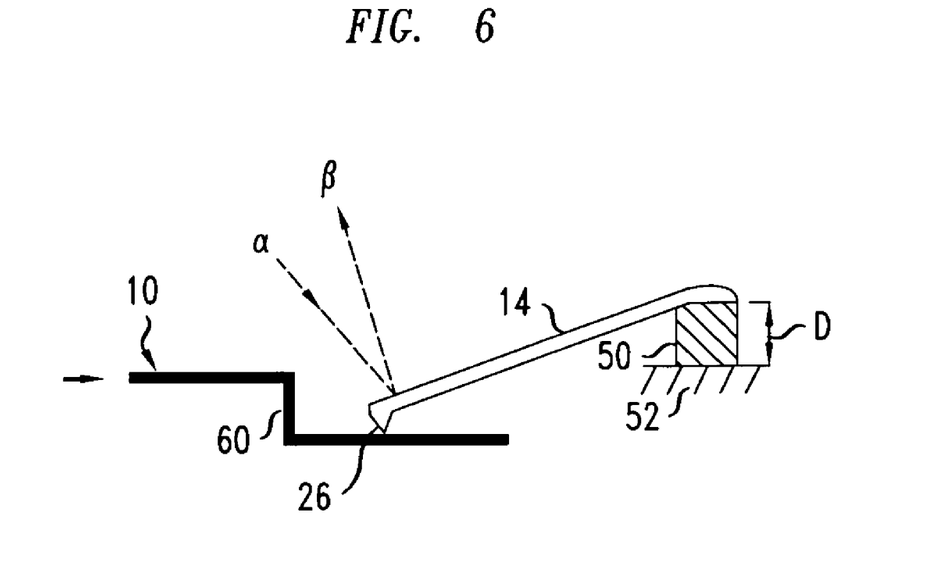
FIGS. 6–9 show a sequence of mechanical states produced responsive to an encounter between the cantilever's tip and a step on the surface of the sample.
Figure 7:
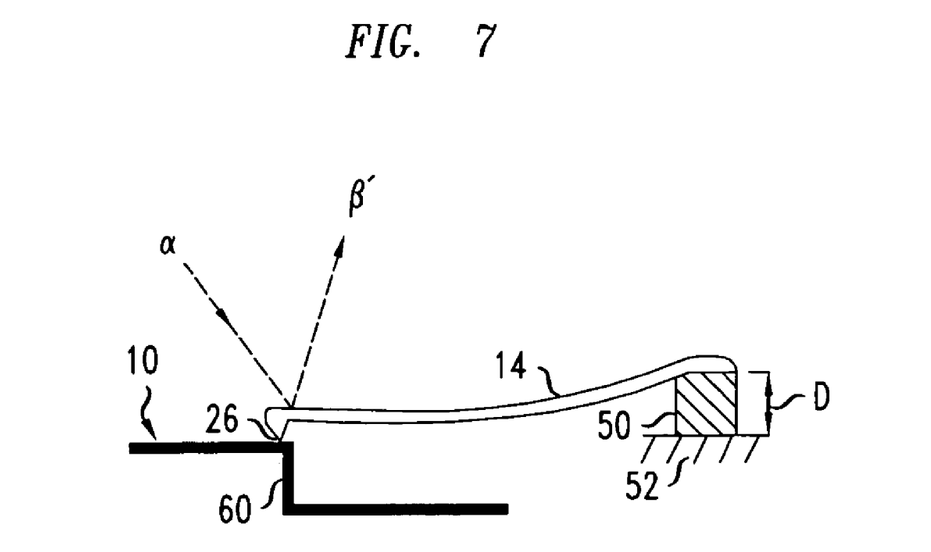

FIGS. 6–9 show the sequence of mechanical states that describes the movements of the cantilever 14 and the sample stage 18 in response to an encounter between the tip 26 and a step 60 on the surface 10 of the sample 12. The sequence includes the mechanical deflection of the cantilever 14 by the step 60 as illustrated by FIGS. 6–7. The sequence also includes rapid and slow restoring movements that restore the mechanical system to its initial state. The initial rapid movement causes an expansion of the piezoelectric driver 50. The rapid expansion nearly restores the force exerted by the surface 10 on the tip 26 to the force exerted thereon prior to the encounter with the step 60. The slower movement displaces the cantilever 14 and the top surface of the sample stage 18 so that the piezoelectric driver 50 is restored to its initial height and so that the vertical force on the tip 26 is restored to the force exerted thereon prior to the encounter with the step 60.

FIG. 6 shows the initial mechanical state of the tip 26, the cantilever 14, and the piezoelectric driver 50 prior to the encounter with step 60 on the surface 10. In the initial mechanical state, the surface 10 applies a vertical force to the tip 26. The applied force causes the cantilever 14 to have a preselected shape. For this shape, laser light that the mirror 30 directs onto the backside of the distal end of the cantilever 14 from direction $\alpha$ will reflect off the cantilever 14 into direction $\beta$. In the initial mechanical state, the piezoelectric driver 50 has height D. For the selected initial mechanical state, the deflection detection system 16 is configured to produce at output port 36 a force error voltage that vanishes. Thus, the cantilever's piezoelectric driver 50 is initially in a relaxed state.

FIG. 7 illustrates the mechanical state of the tip 26, the cantilever 14, and the piezoelectric driver 50 very shortly after the encounter between the tip 26 and the step 60. Now, the surface 10 of the sample 12 applies a relatively larger vertical force to the tip 26. The tip 26 experiences a larger applied force from the surface 10, which causes the cantilever 14 to bend more than in the state of FIG. 6. As a result, light incident on the backside of the distal end of the cantilever from direction $\alpha$ is reflected into new direction $\beta'$. Thus, the angular deflection of the reflected light beam, i.e., $\beta'-\beta$, is nonzero, and the deflection detection system 16 produces a nonzero deflection error voltage at output port 36. Nevertheless, the piezoelectric driver 50 still has height D, because insufficient time has elapsed from the encounter with the step 60 so that the piezoelectric device 50 can mechanically react.

Figure 8:
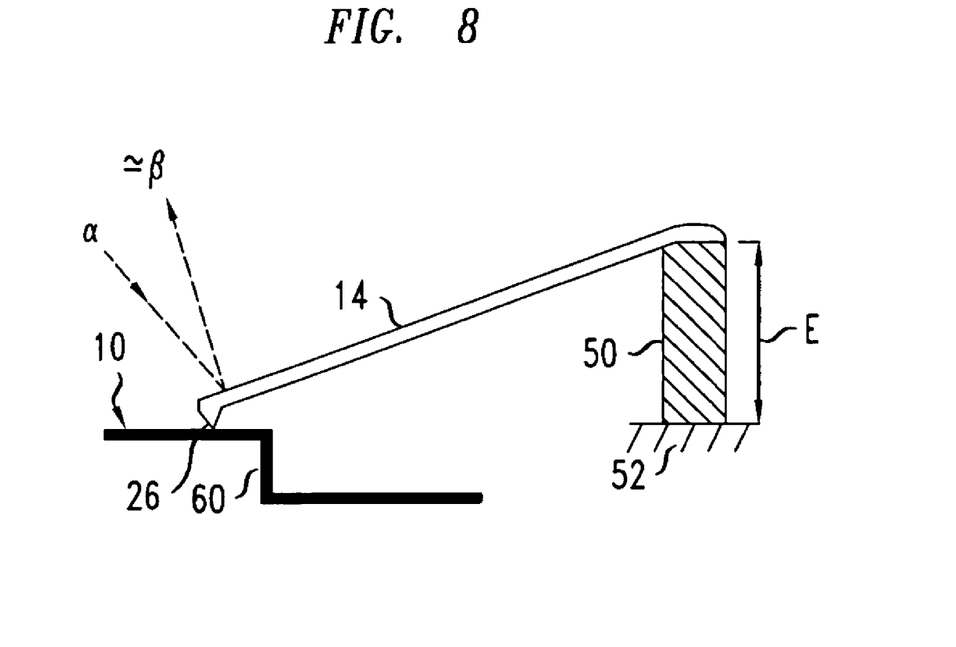

FIG. 8 illustrates the mechanical state of the tip 26, the cantilever 14, and the piezoelectric driver 50 at a longer elapsed time after the encounter between the tip 26 and the step 60. In particular, the elapsed time is long enough for active cantilever feedback system 20 to produce a substantial restoring mechanical reaction, but not long enough for the active sample stage feedback system 22 to produce a substantial restoring mechanical reaction. The active cantilever feedback system 20 produces a faster mechanical reaction than the active sample stage feedback system 22, because the cantilever 14 and piezoelectric driver 50 are much lighter than the sample stage 18 and the piezoelectric driver 50 is more rigid than the piezoelectric drivers 40. The piezoelectric driver 50 has vertically expanded to a height E thereby producing a displacement of the attached end of the cantilever 14, which is almost sufficient to return the cantilever to its shape prior to the encounter between the tip 26 and the step 60. The change to the mechanical state of the piezoelectric driver 50 has resulted from a driving voltage that the active electronic cantilever controller 44 produced in response to the error voltage from the cantilever-force detection system 16. Due to the change to the mechanical state of the cantilever 14, the light beam incident onto the backside of the cantilever 14 from the mirror 30 is now reflected into almost the same direction $\beta$ as shown in FIG. 6. Thus, after the short time for the restoring displacement by the fixed end of cantilever 14, the cantilever-force detection system 16 will again detect only a very small deflection of the cantilever 14 and will output a deflection or force error voltage at output port 36 having a small and slowly varying magnitude.

Figure 9:
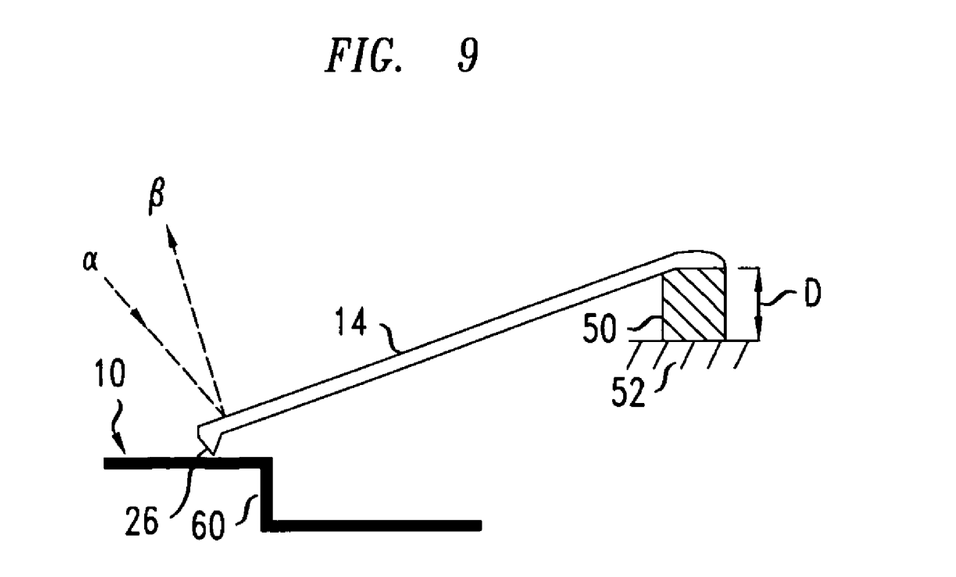

FIG. 9 illustrates the mechanical configuration of the tip 26, the cantilever 14, and the piezoelectric driver 40 at a much longer elapsed time after the encounter between the tip 26 and the step 60. In particular, the elapsed time is long enough for the active sample stage feedback system 22 to produce a substantial restoring mechanical reaction by the heavier sample stage 18. During the longer time, the cantilever's piezoelectric driver 50 has gradually relaxed to its initial state as required by the absence of zero and low frequency components in the drive voltage to the piezoelectric driver 50, i.e., due to the high-pass filter 46. As the piezoelectric driver 50 slowly relaxed due to the AC nature of its driving voltage, the active electronic sample stage controller 54 drives the piezoelectric drivers 40 to raise the height of the top surface of the sample stage 18 or sample platform 38. The reaction of the sample stage 18 catches up with that of the cantilever 14 and that of the cantilever's piezoelectric driver 50 over the longer elapsed time. The sample stage controller 54, which substantially integrates the deflection error voltage, drives the piezoelectric devices 40. For that reason, the active sample stage feedback system 22 stops to vertically displace the top surface of sample stage 18 when the cantilever 14 is at its original deflection as shown in FIG. 6.

In each AFM 8, 8', 8", 8''' of FIGS. 1, 4, 5A, and 5B, the cantilever and stage feedback systems 20, 22 were connected as electrically parallel circuit elements. For that reason, both feedback systems 20, 22 were driven by the same force error voltage, which was generated by the force detection system 16. As illustrated by FIGS. 6–9, the nonzero frequency spectrum of the force error voltage is typically small except for short times after mechanical perturbations of the AFM 8, 8', 8", 8'''. Such mechanical perturbations result from an encounter between the tip 26 and a step, bump, or valley on the surface 10 or from environmental noise that vibrates an AFM component such as the sample stage 18. In particular, the active cantilever feedback system 20 causes a rapid mechanical reaction to such mechanical perturbations by returning the bending state of the cantilever 14 to a value near the cantilever's bending state prior to the mechanical perturbation. The rapid mechanical reaction lowers the subsequent magnitude of the nonzero-frequency component of error voltage, i.e., the error voltage up to a constant setpoint value. Thus, except for the short reaction periods, smaller error voltages should drive active sample stage feedback system 22 at nonzero frequencies.

For various scanning frequencies, much of the power spectrum of the force error voltage produced by encounters between the tip 26 and bumps, valleys, and steps on the surface 10 is damped. In particular, the reaction of the active cantilever feedback system 20 should damp the portion of the spectrum at low frequencies, e.g., at frequencies near mechanical resonances of the sample stage 18. For that reason, this portion of the frequency spectrum of the deflection error voltage should also be significantly damped during the period in which the sample stage 18 makes substantial restoring displacements in response to such mechanical perturbations. Thus, the active electronic sample stage controller 54 should produce an output voltage whose power spectrum is more attenuated at mechanical resonant frequencies of the sample stage 18 than the power spectrum of the sample stage controller in a comparable AFM either having no cantilever piezoelectric driver or having nested cantilever and sample stage feedback loops.

Similarly, attenuating the force error voltage at the sample stage's mechanical resonances should also reduce undesired effects associated with environmental vibration noise. The environmental vibration noise could otherwise be amplified by the active sample stage feedback system 22 to produce motion of the sample stage 18. At resonant frequencies, such motion would reduce correlations between measured driving voltages and the actual motions of the top surface of the sample stage 18. That would reduce the accuracy of topographical images, which are based on determining the y-direction position of the top surface of the sample stage 18 for the AFM 8, 8', 8", 8'''.

Referring to FIGS. 1, 4, 5A, and 5B, some embodiments of the AFMs 8, 8', 8", 8''' implement subtractor 34, cantilever controller 44, high-pass filter 46, image processor 24, and/or sample stage controller 54 digitally in software-controlled hardware.

Figure 10:
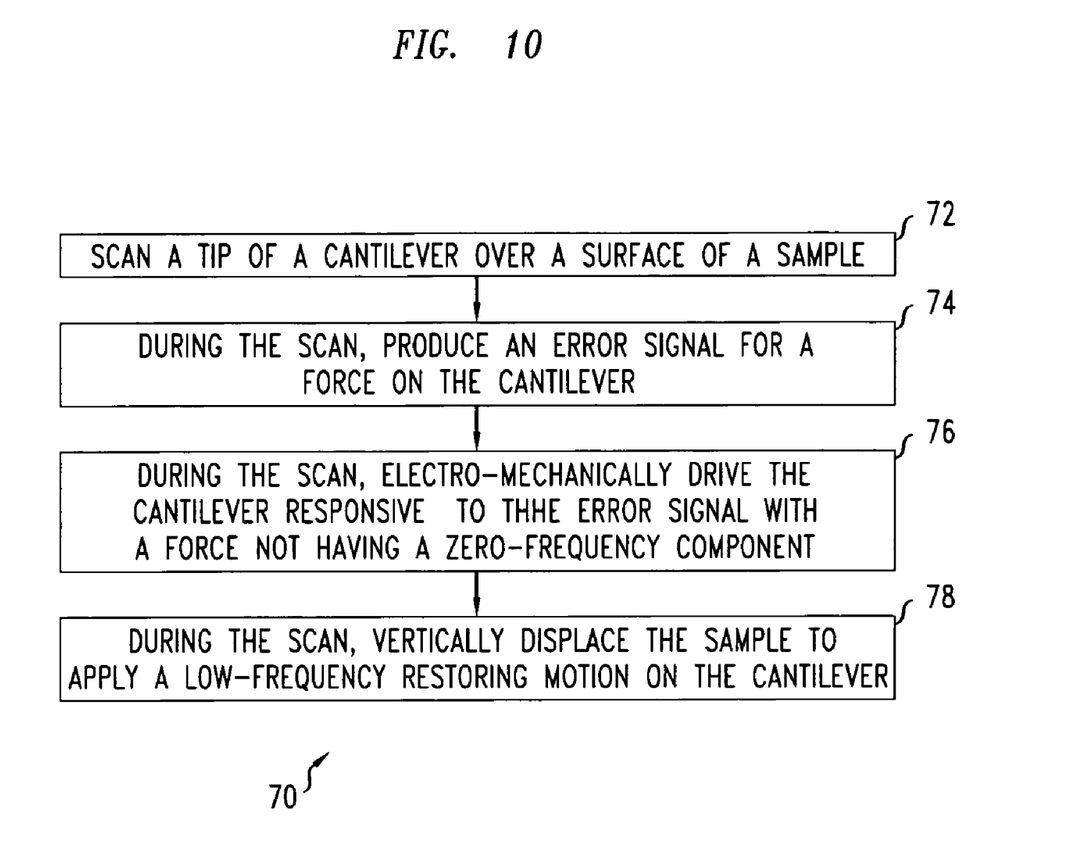
FIG. 10 is a flow chart illustrating a method of operating an AFM, e.g., the AFMs of FIGS. 1, 4, and 5A–5B.

FIG. 10 illustrates a method 70 for operating an AFM, e.g., the AFM 8, 8', 8", 8''' of FIG. 1, 4, 5A, or 5B.

The method 70 includes laterally scanning a tip of a flexible mechanical cantilever over a surface of a sample (step 72). The tip may e.g., be the tip 26 of the cantilever 14 of FIG. 1, 4 5A, or 5B. The scanning step may involve driving a piezoelectric driver so that the sample stage performs the lateral displacements associated with the scan, e.g., as piezoelectric drivers 40 and active electronic sample stage controller 54 drive sample stage 18 or sample platform 38. Exemplary modes for performing the scanning step include modes where the tip remains in contact with the sample, modes where the tip makes regular oscillations over the sample in the x-direction or z-direction, and modes where the tip regularly taps the surface of the sample.

The method 70 includes producing an error signal substantially representative of the vertical force exerted by the sample on the cantilever during the scanning (step 74). The exemplary deflection detection system 16 produces such an error signal at output port 36.

The method 70 includes electromechanically driving the mechanical cantilever with an electromechanical driver in a manner responsive to the error signal during the scanning (step 76). The driving motion produces a displacement not having a zero-frequency component. For example, the active electronic cantilever controller 44, high-pass filter 46, and amplifier 48, and piezoelectric driver 50 together produce a displacement without a zero frequency component. In particular, the displacement has no zero-frequency component, because the voltage applied to piezoelectric driver 50 has been filtered to remove its zero frequency component.

The method 70 includes vertically displacing a sample stage supporting the sample to apply low-frequency components of the restoring movement to the cantilever during the scanning (step 78). For example, the active sample stage feedback system 22 produces a vertical displacement of the top surface of the sample platform 38 with a zero-frequency component.

From the disclosure, drawings, and claims, other embodiments of the invention will be apparent to those skilled in the art.

What is claimed is:

1. An apparatus, comprising:
   a sample stage to support a sample;
   a cantilever mount to mechanically fix a mechanical cantilever having a scanning tip;
   a cantilever-force detector to produce an electronic cantilever-force error signal;
   a cantilever feedback system configured to electromechanically drive the mechanical cantilever in a manner responsive to the cantilever-force error signal; and
   a sample stage feedback system configured to electromechanically displace the sample stage in a manner responsive to the cantilever-force error signal, the cantilever feedback system and the sample stage feedback system being connected to receive the cantilever-force error signal in parallel; and
   wherein the cantilever feedback system includes an electrical high-pass filter, the filter being configured to produce a filtered driving signal responsive to the cantilever-force error signal and having a lower frequency cutoff below a resonance frequency for mechanical oscillations of the stage.

2. The apparatus of claim 1, wherein the feedback systems are configured to restore the cantilever to the preselected state of bending.

3. The apparatus of claim 1, wherein the cantilever feedback system comprises:
   an electromechanical driver fixed to the cantilever mount and connected to be mechanically responsive to the filtered driving signal.

4. The apparatus of claim 1, wherein the sample stage control system comprises:
   an active electronic sample stage controller to produce another electrical driving signal responsive to receiving the error signal; and
   an electromechanical driver configured to cause the displacement of the sample stage responsive to said another driving signal.

5. The apparatus of claim 1, wherein the sample stage control system comprises:
   an active electronic sample stage controller to produce another electrical driving signal responsive to receiving the cantilever-force error signal; and
   an electromechanical driver configured to make the displacement of the sample stage responsive to said another driving signal.

6. The apparatus of claim 1, further comprising a cantilever fixed to the cantilever mount, the cantilever including the scanning tip.

7. An apparatus, comprising:
   a sample stage to support a sample;
   a cantilever mount to mechanically fix a mechanical cantilever having a scanning tip;
   a cantilever-force detector to produce an electronic cantilever-force error signal;
   a cantilever feedback system configured to electromechanically drive the mechanical cantilever in a manner responsive to the cantilever-force error signal;
   an electromechanical driver fixed to the cantilever mount; and a tuning fork being fixed to the electromechanical driver and having the scanning tip, the electromechanical driver being configured to move the tuning fork in a manner responsive to a driving signal; and wherein the cantilever-force detector is configured to produce the error signal responsive to a variation of an electrical property of the tuning fork.

8. The apparatus of claim 7, further comprising:

a sample stage feedback system configured to electromechanically displace the sample stage in a manner responsive to the cantilever-force error signal, the cantilever feedback system and the sample stage feedback system being connected to receive the cantilever-force error signal in parallel.

9. The apparatus of claim 8, wherein the cantilever feedback system comprises:

an electrical high-pass filter to produce a filtered electrical driving signal responsive to receiving the cantilever-force error signal; and wherein the electromechanical is connected to be mechanically responsive to the filtered electrical driving signal.

10. An apparatus for an atomic force microscope, comprising:

a sample platform to support a sample;

a cantilever mount to mechanically fix a cantilever having a scanning tip;

a cantilever-force detector to produce an electronic error signal substantially representative of a force exerted by the sample on the tip;

a cantilever feedback system configured to receive the error signal and to electromechanically drive the tip responsive to the received error signal;

a high-pass filter being configured to produce a filtered driving signal responsive to the error signal;

a sample stage feedback system being configured to cause a displacement by the sample platform responsive to the error signal; and an electromechanical driver configured to receive the filtered driving signal and to displace a portion of the cantilever responsive to said filtered driving signal;

wherein the high-pass filter is configured to cause the electromechanical driver to operate in the absence of zero and low frequency drive voltages.

11. The apparatus of claim 10, wherein the high-pass filter has a lower frequency cutoff below a resonant frequency for mechanical oscillations of the sample platform in a direction perpendicular to two scanning directions of the microscope.

12. The apparatus of claim 11, wherein the sample stage feedback system is able to displace the sample platform in three perpendicular directions.

13. The apparatus of claim 12, further comprising a cantilever fixed to the cantilever mount, the cantilever including the scanning tip.

14. An apparatus for an atomic force microscope, comprising:

a sample platform to support a sample;

a cantilever mount to mechanically fix a cantilever having a scanning tip;

a cantilever-force detector to produce an electronic error signal substantially representative of a force exerted by the sample on the tip;

a cantilever feedback system configured to receive the error signal and to electromechanically drive the tip responsive to the received error signal;

a high-pass filter being configured to produce a filtered driving signal responsive to the error signal;

an electromechanical driver configured to receive the filtered driving signal and to displace a portion of the cantilever responsive to said filtered driving signal; and a tuning fork fixed to the electromechanical driver and having the scanning tip thereon; and wherein the cantilever-force detector is configured to produce the error signal responsive to a variation of an electrical property of the tuning fork.

15. A method of operating an atomic force microscope, comprising:

laterally scanning a tip of a flexible mechanical cantilever over a surface of a sample;

while performing the scanning, producing an error signal substantially representative of a force exerted by the sample on the cantilever;

while performing the scanning, driving the mechanical cantilever with an electromechanical driver in a manner responsive to the error signal; and while performing the scanning, driving a platform holding the sample such that the platform undergoes a motion responsive to the error signal; and wherein the driving by the electromechanical driver produces a displacement of the cantilever without a substantial zero-frequency component.

16. The method of claim 15, wherein the acts of driving are configured to relax a deflection of the cantilever towards a preselected value.

17. The method of claim 15 wherein the motion of the platform has a zero-frequency component in a direction that is perpendicular to the average surface of the sample.

18. The method of claim 15, wherein the driving of the mechanical cantilever comprises applying a driving voltage to the electromechanical driver, the driving voltage being filtered to remove a zero frequency component therefrom.

19. The method of claim 15, wherein the scanning comprises performing a contact mode scan of the sample or an oscillation mode scan of the sample.

* * * * *